(12) United States Patent
Louis

(10) Patent No.: US 9,360,069 B2
(45) Date of Patent: Jun. 7, 2016

(54) HIGH RESOLUTION ONE-WAY CLUTCH USING GRADUATED ENGAGEMENT IN A RADIAL ARRANGEMENT

(71) Applicant: Bendix Spicer Foundation Brake LLC, Elyria, OH (US)

(72) Inventor: John M. Louis, North Ridgeville, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 23 days.

(21) Appl. No.: 14/333,012

(22) Filed: Jul. 16, 2014

(65) Prior Publication Data

US 2016/0017945 A1    Jan. 21, 2016

(51) Int. Cl.
*F16D 65/52* (2006.01)
*F16D 41/063* (2006.01)

(52) U.S. Cl.
CPC .............. *F16D 65/52* (2013.01); *F16D 41/063* (2013.01)

(58) Field of Classification Search
CPC ....... F16D 41/00; F16D 41/069; F16D 41/07; F16D 41/084; F16D 41/09; F16D 41/12; F16D 11/16; F16D 65/60; F16D 65/62
USPC ..... 188/196 B, 196 BA, 196 R, 79.51, 79.55, 188/79.56
See application file for complete search history.

(56) References Cited

U.S. PATENT DOCUMENTS

| | | | |
|---|---|---|---|
| 5,690,202 A | 11/1997 | Myers | |
| 7,100,756 B2 * | 9/2006 | Kimes | F16D 41/12 192/46 |
| 8,302,742 B2 | 11/2012 | Louis et al. | |
| 8,302,744 B2 * | 11/2012 | Louis | F16D 65/60 188/196 B |
| 8,453,805 B2 | 6/2013 | Louis | |
| 8,602,188 B2 * | 12/2013 | Louis | F16D 41/061 192/46 |
| 8,672,101 B2 | 3/2014 | Louis et al. | |
| 2002/0056602 A1 * | 5/2002 | Aurora | F16D 41/063 192/45.1 |
| 2006/0278487 A1 * | 12/2006 | Pawley | F16D 41/12 192/43.1 |
| 2009/0266667 A1 * | 10/2009 | Samie | F16D 41/12 192/43.1 |
| 2012/0043175 A1 | 2/2012 | Louis | |

OTHER PUBLICATIONS

International Search Report (PCT/ISA/220 & PCT/ISA/210) dated Jul. 16, 2015 (three (3) pages).
Written Opinion (PCT/ISA/237) dated Jul. 16, 2015 (six (6) pages).

* cited by examiner

*Primary Examiner* — Christopher Schwartz
(74) *Attorney, Agent, or Firm* — Crowell & Moring LLP

(57) ABSTRACT

An automatic slack adjuster for a vehicle brake includes a one-way clutch having first and second parts rotatable about an axis. The first part is rotatable in both a drive direction and a slip direction opposite to the drive direction, while the second part is driven about the axis by the first part when the first part rotates in the drive direction, but not driven when the first part rotates in the slip direction. Movable elements are carried within receptacles distributed circumferentially about and projecting into one of the parts, and are displaceable so as to move within the receptacles in radial directions relative to the axis. The movable elements engage corresponding surfaces of teeth that are immovably fixed on or form part of a circumferential surface of the other of the parts.

24 Claims, 2 Drawing Sheets

HIGH RESOLUTION ONE-WAY CLUTCH USING GRADUATED ENGAGEMENT IN A RADIAL ARRANGEMENT

BACKGROUND OF THE INVENTION

1. Field of the Invention

The present invention concerns a high resolution, one-way clutch, usable, for example, in an automatic slack adjuster for a vehicle brake, having a graduated saw-tooth engagement and a compact construction.

2. Description of Related Art

A saw-toothed one-way clutch (OWC) is particularly useful with automatic slack adjusters of several types that are appropriate for use in brake devices. In an arrangement of this type, during one part of a braking cycle, i.e. during brake apply or brake return, an input side of the OWC slips past the output side by an angle proportional to an increase in stroke due to brake wear. During the other part of the braking cycle, by contrast, the input side of the OWC engages with teeth of the output side and drives the output side. The output side of the OWC is designed to turn a worm-shaft, which turns a worm gear coupled to a brake cam shaft, thereby compensating for brake lining wear.

Some automatic slack adjusters use wrap spring clutches that employ close wound helical springs made from wire having a square or rectangular cross-section. These clutches are practically stepless, in that, following inputs in slipping directions, they will engage almost instantly in driving directions, and thus deliver outputs in response to very small inputs. A saw-tooth OWC, by contrast, will deliver an output only when an input is large enough to move an input side to engage with a next tooth in a series of teeth. In a saw-tooth OWC, therefore, the tooth spacing angle determines the resolution of the OWC. In practice, due to packaging constraints, the number of saw-teeth is limited to 72, which gives a resolution of five degrees. A slack adjuster stroke or resolution of five degrees, however, is considered too high, as it leaves little or no margin of error for regulatory compliance.

U.S. Pat. No. 8,302,742 to Louis et al., U.S. Pat. No. 8,302,744 to Louis, U.S. Pat. No. 8,453,805 to Louis, and U.S. Pat. No. 8,672,101 to Louis et al. disclose automatic slack adjusters with one-way clutches having varied configurations.

U.S. Pat. No. 8,602,188 to Louis discloses a high resolution clutch using graduated saw-tooth engagement. The clutch forming the subject matter of the Louis ('188) patent has driving and driven parts that are arranged in an axial stack and that engage or disengage by axial movement of floating teeth. Automatic slack adjusters typically have packaging constraints that make it difficult to utilize this arrangement, however, and so an alternative arrangement is desirable.

The entire disclosure of each of the U.S. Patents identified above is incorporated herein by reference as non-essential subject matter.

SUMMARY OF THE INVENTION

According to this invention, an automatic slack adjuster for a vehicle brake includes a one-way clutch for the slack adjuster. The one-way clutch includes a first part that is rotatable about an axis in both a drive direction and a slip direction opposite to the drive direction, as well as a second part that is driven about the axis by the first part when the first part rotates in the drive direction but that is not driven by the first part when the first part rotates in the slip direction. A plurality of movable elements is carried within receptacles distributed circumferentially about and projecting into one of the parts mentioned. These movable elements are displaceable so as to move within the receptacles in radial directions relative to the axis about which the first and second parts are driven relative to both of the parts. The elements engage corresponding surfaces of teeth that are immovably fixed on or form part of a circumferential surface of the other of the parts to provide for clutch operation.

The first part could be either an input part or an output part of the clutch. Preferably, the movable elements carried by one of the parts have inclined end faces engaging the corresponding surfaces of the teeth that are immovably fixed on or form part of the circumferential surface of the other of the parts, and it is contemplated that the movable elements will be biased to protrude from the receptacles into engagement with the corresponding surfaces of the teeth of the other part. In a selected clutch engagement state, some of the movable elements will have tips fully received between tips of the immovably fixed teeth, and the rest of the movable elements will have tips that are not fully received between those tips. A resilient element is preferably disposed in each of the receptacles to bias the movable elements into engagement with the corresponding surfaces of the teeth that are immovably fixed on or form part of the circumferential surface of the other of the parts. Although the invention is not to be considered limited to such constructions, it is considered advantageous to include thirty six of the immovably fixed teeth and ten or fifteen of the movable elements in the clutch arrangement.

The radially nested arrangement of the driving and driven parts of a clutch according to the present invention permits a clutch construction that is more compact that an axial arrangement such as that of the Louis ('188) patent. This radially nested arrangement also allows the driving and driven parts to be integrated into a semi-permanent assembly, which will securely hold the parts together and allow convenient storage and handling.

The present invention additionally concerns both the one way clutch per se, as well as an automatic slack adjuster subassembly, formed by or including the one-way clutch, which can be neatly packaged for quick insertion into the overall slack adjuster body. This is made possible by the modified geometrical relationship between the driving and driven parts according to the present invention, since this modified relationship makes it unnecessary to perform tooth alignment operations.

DETAILED DESCRIPTION OF THE INVENTION

Figure 1:
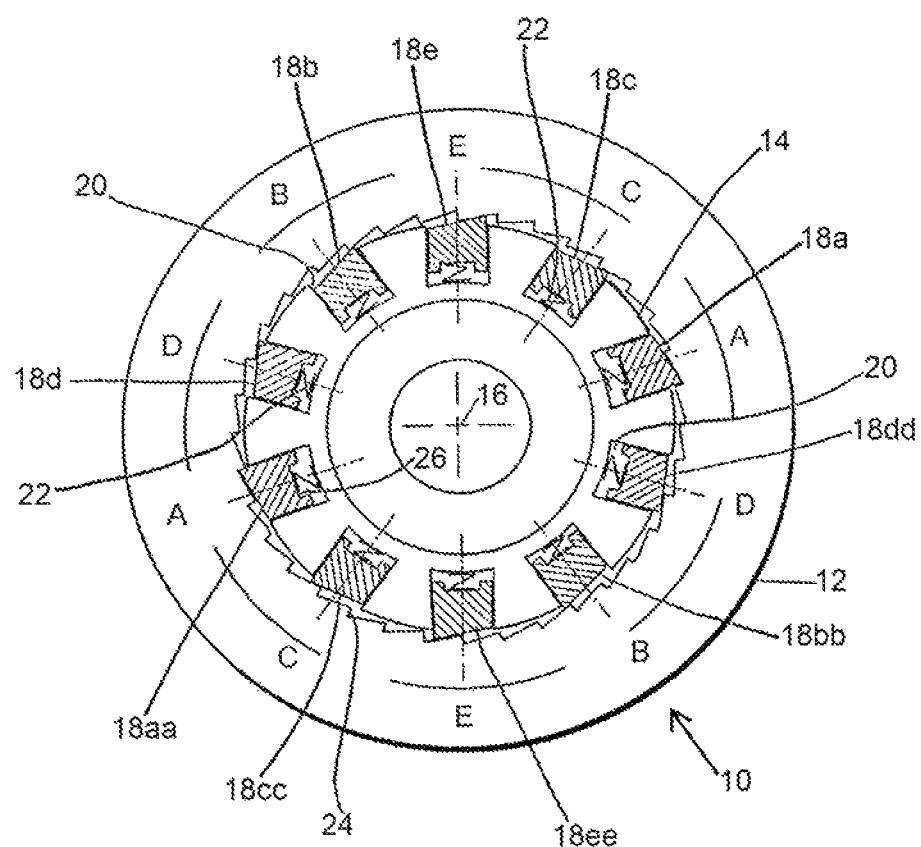
FIG. 1 is a schematic cross-sectional illustration of a graduated saw-tooth one-way clutch according to a preferred embodiment of the invention.

The clutch 10 illustrated in FIG. 1 is a high resolution, one-way clutch with graduated saw-tooth engagement. The clutch 10 includes a first, outer driving part 12 formed by a clutch wheel that is rotatable about an axis 16 in both a drive direction (counterclockwise in the drawing) and a slip direction (clockwise in the drawing). The clutch also includes a second, inner driven part 14 that is driven about the axis 16 by the first part 12 when the first part rotates in the drive direction, but not when the first part rotates in the slip direction. The outer driving part 12 and the inner driven part 14 are radially arranged on the same axis 16. It is possible, of course, to reverse the operation of the outer and inner parts, such that the inner part is a driving part, while the outer part is a driven part. In the embodiment illustrated, the outer driving part 12 is tubular, and has a saw-tooth pattern cut of thirty-six teeth 24, equally spaced and cut lengthwise, extending circumferentially around its inner diameter.

Movable saw-tooth topped blades, teeth, or other elements 18a, 18aa, 18b, 18bb, 18c, 18cc, 18d, 18dd, 18e, and 18ee are slidably received in and carried within respective radially extending, radially opening slots, bores or other such receptacles 20 radially projecting into the inner driven part 14. Although it is contemplated that the receptacles 20 will have central axes inclined approximately perpendicularly relative to the axis 16, some variation in receptacle orientation is permissible. Respective springs 22, which could be of coil, leaf, volute, elastomeric, or equivalent form, are disposed between bases of the receptacles 20 and seats 26 defined on radially inwardly facing portions of the movable elements 18a-18ee. The movable elements 18a-18ee are axially displaceable within the receptacles 20, in a radial direction relative to the parts 12, 14, but are kept pressed against the driving part teeth 24 by the springs 22. The number of movable elements is a multiple of five, such as ten or, if possible, fifteen. As illustrated, ten movable saw-tooth topped elements 18a-18ee are distributed at equal spacings about the circumference of the inner driven part 14.

In the arrangement shown, the outer driving part 12, again, has thirty-six teeth 24, with a consistent 10 degree tooth spacing. As there are ten of the movable elements 18a-18ee distributed about the inner driven part 14, the elements 18a-18ee are spaced 36 degrees apart. The movable elements 18a-18ee of the inner part 14 and the saw-tooth patterned teeth 24 of the outer part 12 will be in engagement every 180 degrees, such that of the ten movable elements 18a-18ee, two elements, such as the elements 18a, 18aa shown, that are located 180 degrees apart or diametrically opposite each other will be in engagement with corresponding teeth 24 of the outer driving part. Similarly, with fifteen consistently spaced saw-tooth topped elements included in the inner driven part 14, three movable elements, located 120 degrees apart, will be in engagement with corresponding teeth 24 of the outer driving part 12. In each arrangement, some of the movable elements will have tips fully receivable between tips of the teeth that are immovably fixed on or form part of the circumferential surface of the other of the part.

In an arrangement in which the inner driven part 14 includes ten movable elements, there will be four of those movable elements disposed in each circumferential direction that are not engaged between the two elements that are in engagement with the teeth 24 of the outer driving part. By way of illustration, referring to the drawing figure, four intermediate movable saw-tooth topped elements 18dd, 18bb, 18ee, and 18cc are disposed in one circumferential direction between the engaged element 18a and the engaged element 18aa, and four intermediate movable saw-tooth topped elements 18c, 18e, 18b, and 18d are disposed in the other circumferential direction between the engaged element 18a and the engaged element 18aa.

The four intermediate elements disposed between the engaged elements carried by the inner driven part will be in various stages of progress toward engagement. These four intermediate elements will require rotation of one of the parts 12, 14 relative to the other of from two degrees to eight degrees, in two degree increments, to achieve engagement with the teeth 24. Referring by way of example to the arrangement illustrated in the drawing, in the position shown, a relative rotation between the parts 12, 14 of two degrees will result in engagement of the elements 18b, 18bb at position B rather than the elements 18a, 18aa at position A with the teeth 24. Similarly, relative rotations between the parts 12, 14 of four, six, and eight degrees will respectively result in engagement of the elements 18c, 18cc at position C, the elements 18d, 18dd at position D, and the elements 18e, 18ee at position E rather than the teeth 18a, 18aa at position A with the teeth 24. Engagement thus will take place upon every two degrees of relative rotation between the parts 12 and 14, resulting in an overall clutch resolution of two degrees.

Figure 2:
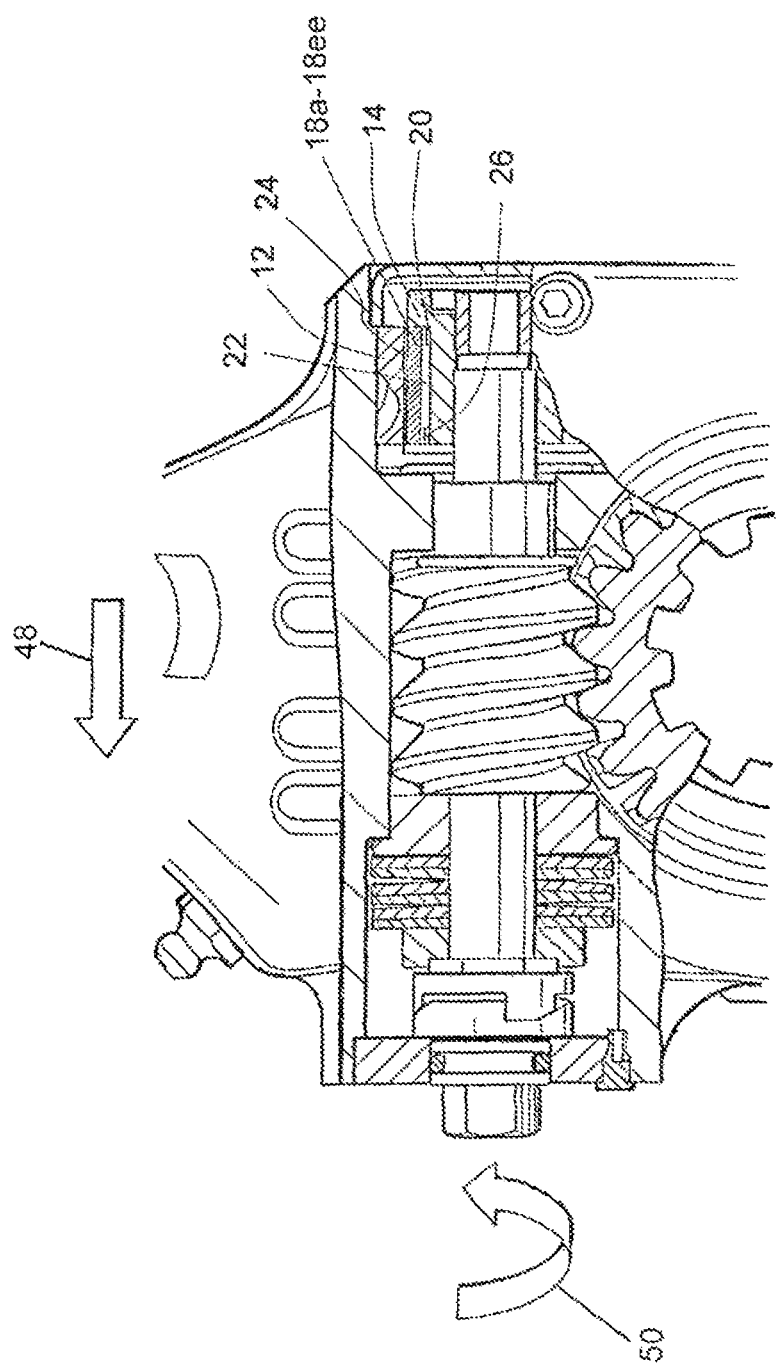
FIG. 2 is a part sectional illustration showing a slack adjuster utilizing a graduated saw-tooth one-way clutch such as that shown in FIG. 1.

FIG. 2 shows a slack adjuster incorporating the graduated saw-tooth one-way clutch 10 shown in FIG. 1. A brake application direction 48 and an adjuster worm screw rotation direction 50 are also identified. The axial relationship between the driving and driven parts of the clutch is apparent from FIG. 2. In particular, the spatial relationship between the worm shaft (not indicated) and other slack adjuster elements, including the outer and inner clutch parts 12 and 14, is evident. A brake application direction and an adjuster worm screw rotation direction 50 are identified in FIG. 2 as well. By way of the modified geometrical relationship between the driving and driven parts according to the present invention, the clutch is provided with a radially nested driving and driven part arrangement, permitting realization of a clutch construction that is more compact and, as a result, a slack adjuster having reduced dimensions overall. Referring now to both FIG. 1 and FIG. 2, the clutch 10 of a slack adjuster according to the present invention is shown as including a portion of the second, inner part 14 that is radially nested within a surrounding portion of the first, outer part 12. One of the movable saw-tooth topped elements 18a-18ee is shown as slidably received in and carried within a respective radially extending, radially opening receptacle 20 in the inner part. It will be apparent to those of ordinary skill in the art that, due to the overlapping, radially nested relationship between portions of the inner part 14 and the outer part 15 of the clutch 10, the smaller, more compact clutch construction of the present invention is made possible, permitting construction of the slack adjuster with reduced dimensions overall mentioned.

Because of the radially nested driving and driven part arrangement of the present invention, the driving and driven parts 12 and 14 can be preassembled into a subassembly formed by or including a clutch 10. The modified geometrical relationship between the driving and driven parts according to the present invention makes it unnecessary to perform tooth alignment operations when assembling the overall automatic slack adjuster, so that such a subassembly can be neatly packaged for quick insertion into the overall slack adjuster body.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A one-way clutch for an automatic slack adjuster, comprising:
   a first part rotatable about an axis in both a drive direction and a slip direction opposite to the drive direction,
   a second part that is driven about the axis by the first part when the first part rotates in the drive direction but that is not driven by the first part when the first part rotates in the slip direction, and a plurality of movable elements carried within receptacles distributed circumferentially about and projecting into one of the parts, the movable elements being displaceable so as to move within the receptacles in radial directions relative to the axis about which the first and second parts are driven relative to both of the parts and engaging corresponding surfaces of teeth that are immovably fixed on or form part of a circumferential surface of the other of the parts, wherein, in each clutch engagement state, at least two of the movable elements are biased radially relative to the first and second parts so as to have tips fully received between tips of the teeth that are immovably fixed on or form part of the circumferential surface of the other of the parts, and at least eight of the movable elements have tips that are biased radially relative to the first and second parts but are not fully received between the tips of the teeth that are immovably fixed on or form part of the circumferential surface of the other of the parts.

2. The one-way clutch according to claim 1, wherein the movable elements have inclined end faces engaging the corresponding surfaces of the teeth that are immovably fixed on or form part of the circumferential surface of the other of the parts.

3. The one-way clutch according to claim 2, wherein the movable elements are biased to protrude from the receptacles into engagement with the corresponding surfaces of the teeth that are immovably fixed on or form part of the circumferential surface of the other of the parts.

4. The one-way clutch according to claim 3, further comprising a resilient element disposed in each of the receptacles to bias the movable elements into engagement with the corresponding surfaces of the teeth that are immovably fixed on or form part of the circumferential surface of the other of the parts.

5. The one-way clutch according to claim 1, wherein the first part is an input part of the clutch.

6. The one-way clutch according to claim 1, wherein the first part is an output part of the clutch.

7. The one-way clutch according to claim 1, wherein thirty six of the teeth that are immovably fixed on or form part of the circumferential surface of the other of the parts are provided.

8. The one-way clutch according to claim 1, wherein ten of the movable elements are provided.

9. The one-way clutch according to claim 1, wherein fifteen of the movable elements are provided, three of the movable elements have tips fully received between said tips of the teeth, and twelve of the movable elements have tips that are not fully received between said tips of the teeth.

10. An automatic slack adjuster for a vehicle brake including a one-way clutch for the slack adjuster, the one-way clutch comprising:
   a first part rotatable about an axis in both a drive direction and a slip direction opposite to the drive direction,
   a second part that is driven about the axis by the first part when the first part rotates in the drive direction but that is not driven by the first part when the first part rotates in the slip direction, and
   a plurality of movable elements carried within receptacles distributed circumferentially about and projecting into one of the parts, the movable elements being displaceable so as to move within the receptacles in radial directions relative to the axis about which the first and second parts are driven relative to both of the parts and engaging corresponding surfaces of teeth that are immovably fixed on or form part of a circumferential surface of the other of the parts,
   wherein, in each clutch engagement state, at least two of the movable elements are biased radially relative to the first and second parts so as to have tips fully received between tips of the teeth that are immovably fixed on or form part of the circumferential surface of the other of the parts, and at least eight of the movable elements have tips that are biased radially relative to the first and second parts but are not fully received between the tips of the teeth that are immovably fixed on or form part of the circumferential surface of the other of the parts.

11. The automatic slack adjuster according to claim 10, wherein the movable elements have inclined end faces engaging the corresponding surfaces of the teeth that are immovably fixed on or form part of the circumferential surface of the other of the parts.

12. The automatic slack adjuster according to claim 11, wherein the movable elements are biased to protrude from the receptacles into engagement with the corresponding surfaces of the teeth that are immovably fixed on or form part of the circumferential surface of the other of the parts.

13. The automatic slack adjuster according to claim 12, further comprising a resilient element disposed in each of the receptacles to bias the movable elements into engagement with the corresponding surfaces of the teeth that are immovably fixed on or form part of the circumferential surface of the other of the parts.

14. The automatic slack adjuster according to claim 10, wherein the first part is an input part of the clutch.

15. The automatic slack adjuster according to claim 10, wherein the first part is an output part of the clutch.

16. The automatic slack adjuster according to claim 10, wherein thirty six of the of the teeth that are immovably fixed on or form part of the circumferential surface of the other of the parts are provided.

17. The automatic slack adjuster according to claim 10, wherein ten of the movable elements are provided.

18. The automatic slack adjuster according to claim 10, wherein fifteen of the movable elements are provided, three of the movable elements have tips fully received between said tips of the teeth, and twelve of the movable elements have tips that are not fully received between said tips of the teeth.

19. An automatic slack adjuster subassembly having a one-way clutch, comprising:
   a first part rotatable about an axis in both a drive direction and a slip direction opposite to the drive direction,
   a second part that is driven about the axis by the first part when the first part rotates in the drive direction but that is not driven by the first part when the first part rotates in the slip direction, and
   a plurality of movable elements carried within receptacles distributed circumferentially about and projecting into one of the parts, the movable elements being displaceable so as to move within the receptacles in radial directions relative to the axis about which the first and second parts are driven relative to both of the parts and engaging corresponding surfaces of teeth that are immovably fixed on or form part of a circumferential surface of the other of the parts,
   wherein, in each clutch engagement state, at least two of the movable elements are biased radially relative to the first and second parts so as to have tips fully received between tips of the teeth that are immovably fixed on or form part of the circumferential surface of the other of the parts, and at least eight of the movable elements have tips that are biased radially relative to the first and second parts but are not fully received between the tips of the teeth that are immovably fixed on or form part of the circumferential surface of the other of the parts.

20. The automatic slack adjuster subassembly according to claim 19, wherein the movable elements have inclined end faces engaging the corresponding surfaces of the teeth that are immovably fixed on or form part of the circumferential surface of the other of the parts.

21. The automatic slack adjuster subassembly according to claim 20, wherein the movable elements are biased to protrude from the receptacles into engagement with the corresponding surfaces of the teeth that are immovably fixed on or form part of the circumferential surface of the other of the parts.

22. The automatic slack adjuster subassembly according to claim 21, further comprising a resilient element disposed in each of the receptacles to bias the movable elements into engagement with the corresponding surfaces of the teeth that are immovably fixed on or form part of the circumferential surface of the other of the parts.

23. The automatic slack adjuster subassembly according to claim 19, wherein the first part is an input part of the clutch.

24. The automatic slack adjuster subassembly according to claim 19, wherein the first part is an output part of the clutch.

\* \* \* \* \*